us009055399B1

United States Patent
Naim et al.

(10) Patent No.: US 9,055,399 B1
(45) Date of Patent: Jun. 9, 2015

(54) SYSTEMS AND METHODS OF TRACKING AREA ADJUSTMENT

(71) Applicant: Sprint Spectrum LP, Overland Park, KS (US)

(72) Inventors: Muhammad Naim, Sterling, VA (US); Daniel Vivanco, Sterling, VA (US); Yu Zhou, Herndon, VA (US); Shahzada Rasool, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 132 days.

(21) Appl. No.: 13/761,042

(22) Filed: Feb. 6, 2013

(51) Int. Cl.
*H04W 8/02* (2009.01)

(52) U.S. Cl.
CPC .................................... *H04W 8/02* (2013.01)

(58) Field of Classification Search
CPC ...... H04L 63/10; H04L 67/12; H04W 72/042; H04W 36/0072
See application file for complete search history.

(56) References Cited

U.S. PATENT DOCUMENTS

| | | | |
|---|---|---|---|
| 8,700,059 B1 * | 4/2014 | Vivanco et al. | 455/456.1 |
| 8,942,704 B1 * | 1/2015 | Vivanco et al. | 455/436 |
| 2007/0232321 A1 * | 10/2007 | Casati et al. | 455/456.1 |
| 2008/0220782 A1 * | 9/2008 | Wang et al. | 455/436 |
| 2011/0096731 A1 * | 4/2011 | Kamalaraj et al. | 370/329 |
| 2013/0344890 A1 * | 12/2013 | Hahn et al. | 455/456.1 |

* cited by examiner

*Primary Examiner* — Fan Ng

(57) ABSTRACT

In systems and methods of tracking area adjustment, a number of tracking area update messages based on a transition of wireless devices from a first access node associated with a first tracking area to a second access node associated with a second tracking area are monitored. When the number of tracking area update messages meets a threshold, the association of the first access node is changed to the second tracking area.

18 Claims, 6 Drawing Sheets

SYSTEMS AND METHODS OF TRACKING AREA ADJUSTMENT

TECHNICAL BACKGROUND

A wireless device in communication with a communication system can enter a low power or idle mode, for example, to conserve network resources as well as power storage on the wireless device. When the wireless device is in idle mode, the wireless device typically is not in continuous or active communication with the communication system. In order to notify a wireless device which is in idle mode of the arrival or availability of data for the wireless device, a last known network connection of the wireless device can be stored in the communication system. For example, a controller node, such as a mobility management entity or other controller element of the communication system, can store a last known access node with which the wireless device was in communication. Further, access nodes can be organized into groups of access nodes which can be used to send a notification to the wireless device in the event that the wireless device cannot be located at the last known access node. Examples of such access node groups comprise a tracking area and a routing area.

Overview

In operation, a number of tracking area update messages based on a transition of wireless devices from a first access node associated with a first tracking area to a second access node associated with a second tracking area are monitored. When the number of tracking area update messages meets a threshold, the association of the first access node is changed to the second tracking area. In an embodiment, the association of the first access node can also be changed based on the mobility of wireless devices from the first access node to the second access node. In an embodiment, the association of the first access node can also be changed based on determined first and second channel loads of the first and second access nodes.

DETAILED DESCRIPTION

Figure 1A:
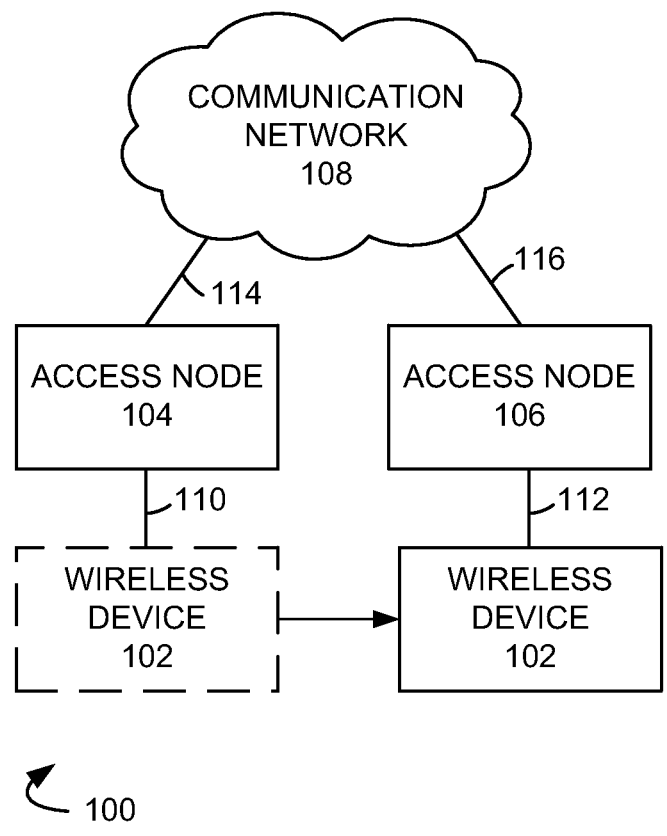
FIG. 1A illustrates an exemplary communication system of tracking area adjustment.

FIG. 1 illustrates an exemplary communication system 100 of tracking area adjustment comprising wireless device 102, access nodes 104 and 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110 and with access node 106 over communication link 112.

Access nodes 104 and 106 are each a network node capable of providing wireless communications to wireless device 102, and can be, for example, a base transceiver station, a radio base station, an eNodeB device, or an enhanced eNodeB device. Access node 104 is in communication with communication network 108 over communication link 114, and access node 106 is in communication with communication network over communication link 116. Access nodes 104 and 106 can each be a member of a group of access nodes, such as a tracking area or a routing area. A tracking area or routing area (referred to hereafter as a tracking area for conciseness) can be used to send a notification message to wireless device 102. For example, when wireless device 102 enters an idle mode, wireless device 102 may not be in active communication with communication system 100. When data arrives for, or is available for, wireless device 102, a notification message can be sent to wireless device 102 through the access nodes of the tracking area. Access node 104 is in communication with communication network 108 over communication link 114, and access node 106 is in communication with communication network 108 over communication link 116.

Figure 1B:
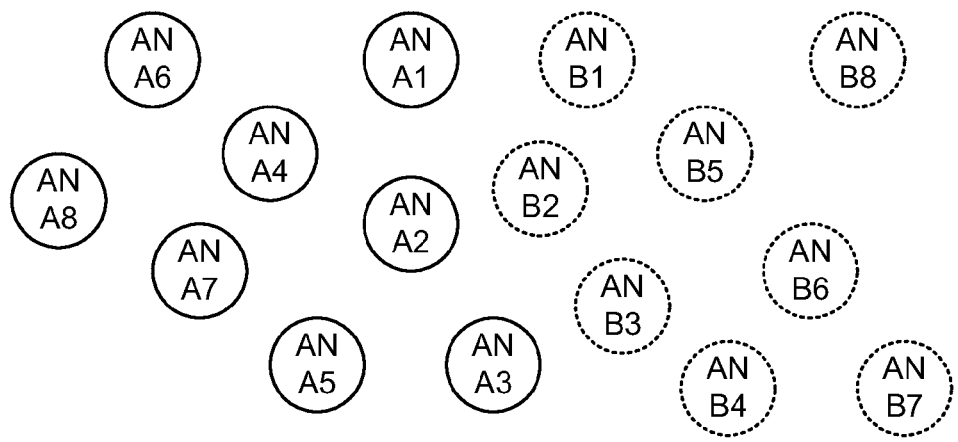
FIGS. 1B and 1C illustrate exemplary tracking areas.

In an embodiment, access node 104 can be a member of a first tracking area, and access node 106 can be a member of a second tracking area. It will be understood that each tracking area can comprise a plurality of access nodes. For example, FIG. 1B illustrates exemplary tracking areas A and B. Tracking area A comprises access nodes A1-A8, and tracking area B comprises access nodes B1-B8. The number of access nodes in tracking areas A and B illustrated in FIG. 1B is merely exemplary, and a tracking area can comprise more or fewer access nodes. Access nodes A1, A2, A3, B1, B2 and B3 are located in a bordering region between tracking areas A and B. A wireless device moving, for example, from access node A1 to access node B1, can send a tracking area update (TAU) message or a similar message to notify communication network 108 that it has moved from tracking area A to tracking area B.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice and other information, for example, to support voice and data communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise additional base stations, controller nodes, telephony switches, internet routers, network gateways, computer systems, communication links, or some other type of communication equipment, and combinations thereof.

Communication links 110, 112, 114, and 116 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobility management entities, mobile switching centers, dispatch application processors, home subscriber services, and location registers such as a home location register or visitor location register. Furthermore, other network elements may be present to facilitate communication between access node 104, access node 106 and communication network 108 including additional processing nodes, routers, gateways, and physical and/or wireless data links for carrying data among the various network elements.

A wireless device can enter into a lower power state, such as an idle mode or a sleep mode, in which the wireless device is not in continuous communication with an access node. In order to notify a wireless device which is in idle mode of the arrival or availability of data for the wireless device, a last known network connection of the wireless device can be stored in the communication system. For example, a controller node, such as a mobility management entity or other controller element of the communication system, can store a last known access node with which the wireless device was in communication. In addition, access nodes can be organized into groups of access nodes which can be used to send a notification to the wireless device in the event that the wireless device cannot be located at the last known access node. One method of maintaining a record of a recent location of a wireless device is by use of a tracking area or a routing area (referred to herein as a tracking area for conciseness). A tracking area comprises a group of access nodes which are associated with an identifier such as a tracking area code. When a message such as data arrives for a wireless device in an idle mode, a first paging message can be sent to the access node most recently in communication with the wireless device. When the wireless device does not respond to the first paging message within a predetermined period of time, a second paging message can be sent to all of the access nodes in the tracking area. When a wireless device moves from a first tracking area to a second tracking area, the wireless device can send a tracking area update (TAU) message to update the communication system of its new tracking area. The tracking area can be determined by the wireless device based on information transmitted by an access node.

Figure 1C:
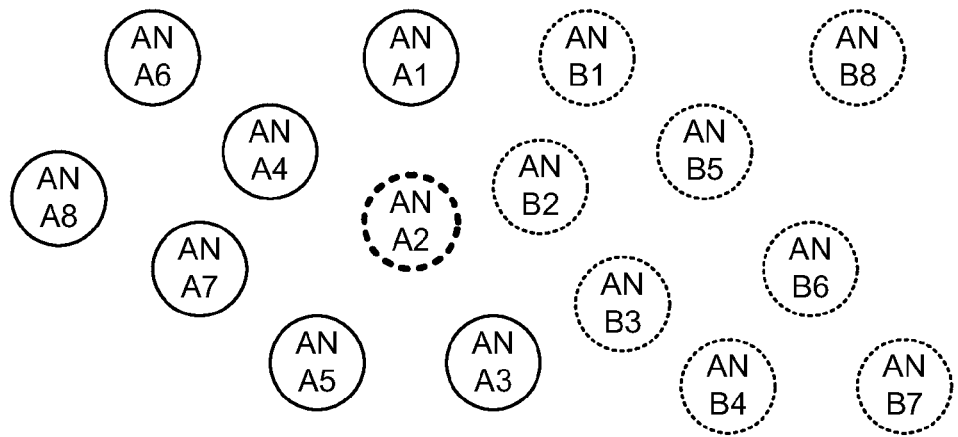

In operation, a number of tracking area update messages based on a transition of wireless devices from access node 102 associated with a first tracking area to access node 106 associated with a second tracking area are monitored. When the number of tracking area update messages meets a threshold, the association of access node 104 is changed to the second tracking area. In an embodiment, the association of access node 102 can also be changed based on the mobility of wireless devices from access node 102 to access node 106. In an embodiment, the association of access node 104 can also be changed based on determined first and second channel loads of access nodes 104 and 106. Each tracking area can comprise a plurality of access nodes, as illustrated in FIGS. 1B and 1C. In an embodiment, the association of one access node can be changed from a first tracking area to a second tracking area. For example, a tracking node association of access node A2 can be changed from tracking area A to tracking area B, as further described below.

Figure 2:
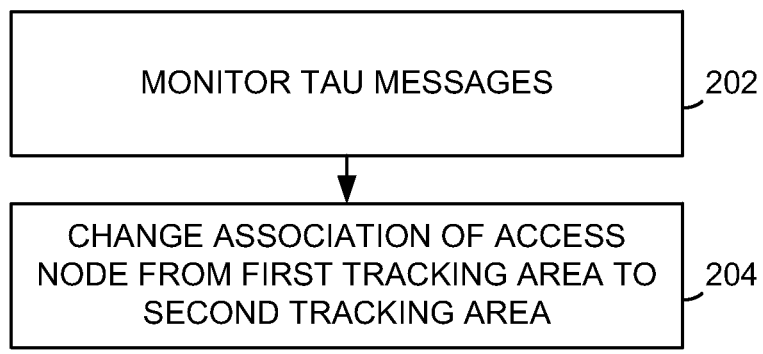
FIG. 2 illustrates an exemplary method of tracking area adjustment.

FIG. 2 illustrates an exemplary method of tracking area adjustment. When a wireless device moves from a first tracking area to a second tracking area, the wireless device can send a tracking area update (TAU) message to update communication system 100 of its new tracking area. For example, wireless device 102 can change from communicating with access node 104 over communication link 110 to communicating with access node 106 over communication link 112. In an embodiment, wireless device 102 can be in active communication with access node 104 and can enter an idle mode. Wireless device 102 can then move from a coverage area of access node 104 to a coverage area of 106, and further can communicate with access node 106, for example, through cell reselection or a similar process. Access node 104 can be a member of a first tracking area, and access node 106 can be a member of a second tracking area. When wireless device 102 moves from the first tracking area to the second tracking area, then wireless device 102 can send a TAU message to communication network 108 through access node 106.

In operation 202, tracking area update messages are monitored based on a transition of wireless devices from a first access node associated with a first tracking area to a second access node associated with a second tracking area. For example, TAU messages received by access node 106 can be monitored. The TAU messages can be related to, for example, a transition of wireless device 102 from communication with access node 104 to communication with access node 106. The communication between wireless device 102 and access nodes 104 and 106 can be non-continuous, for example, where wireless device 102 is in an idle mode. As another example, referring to FIG. 1B, TAU messages received by access nodes A1, A2, A3, which can be members of a first tracking area A, and received by access nodes B1, B2, B3, which can be members of a second tracking area B, can be monitored. As a volume of TAU messages increases, the signaling overhead of an access node increases, which can lead to network congestion, as well as additionally processing load on network elements of the communication system including access nodes and controller nodes.

In operation 204, when the number of tracking area update messages meets a threshold, the association of the first access node is changed to the second tracking area. For example, when the number of TAU messages meets a threshold, the tracking area association of access node 104 can be changed from the first tracking area to the second tracking area. For example, a number of TAUs received at access node B2 can be monitored, which can be based on a transition of wireless devices from access node A2 associated with a tracking area A to access node B2 associated with a second tracking area B. When the number of TAUs received at access node B2 meets a threshold, the association of access node A2 can be changed from tracking area A to tracking area B. FIG. 1C illustrates adjusted tracking areas A and B, with the association of access node A2 changed from tracking area A to tracking area B.

Figure 3:
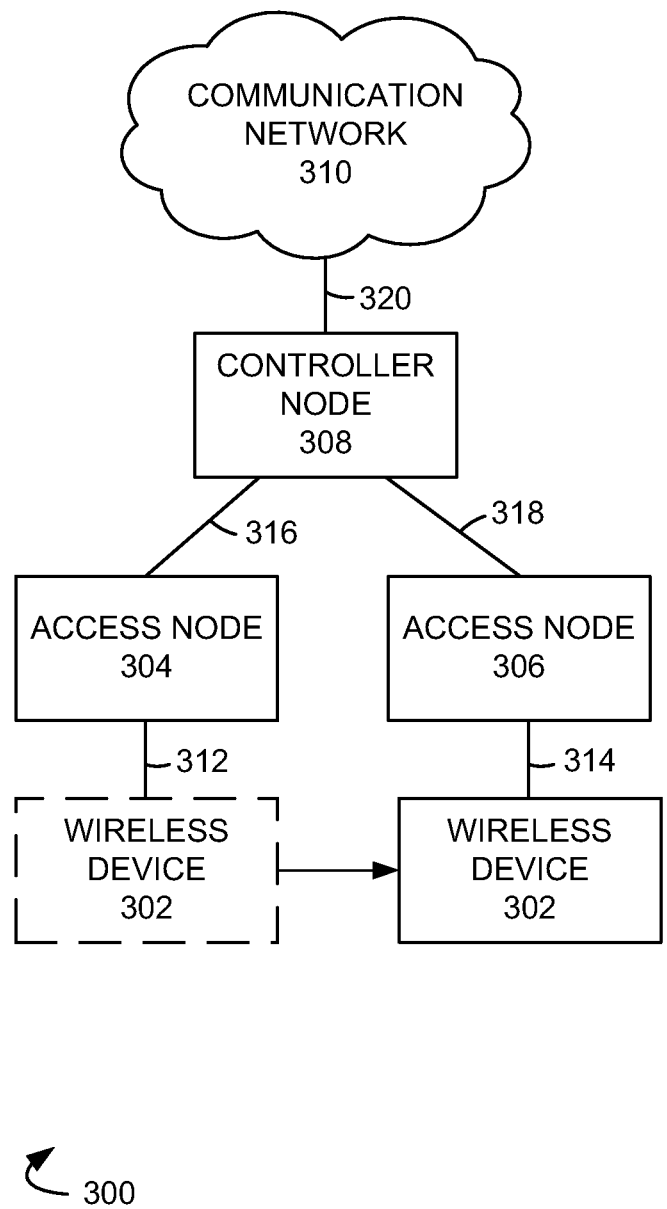
FIG. 3 illustrates another exemplary communication system of tracking area adjustment.

FIG. 3 illustrates another exemplary communication system 300 of tracking area adjustment comprising wireless device 302, access nodes 304 and 306, controller node 308, and communication network 310. Examples of wireless device 102 can comprise a cell phone, a smart phone, a computing platform such as a laptop, palmtop, or tablet, a personal digital assistant, or an internet access device, including combinations thereof. Wireless device 302 can communicate with access node 304 over communication link 312 and with access node 306 over communication link 314.

Access nodes 304 and 306 are each a network node capable of providing wireless communications to wireless device 302, and can be, for example, a base transceiver station, a radio base station, an eNodeB device, or an enhanced eNodeB device. Access node 304 is in communication with controller node 308 over communication link 316, and access node 306 is in communication with controller node 308 over communication link 318. Access nodes 304 and 306 can each be a member of a group of access nodes, such as a tracking area.

Controller node 308 is a network element which can comprise a processor and associated circuitry to execute or direct the execution of computer-readable instructions to related to adjusting tracking areas. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can receive instructions and other input at a user interface. Examples of controller node 308 can include a standalone computing device, a computer system, or a network component, such as a mobility management entity (MME), a mobile switching center (MSC), a call session control function (CSCF), and the like. Controller node 308 and can be accessible, for example, by a wired or wireless connection, or through an indirect connection such as through a computer network or communication network. Controller node is in communication with communication network 310 over communication link 320.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 can be capable of carrying voice and other information, for example, to support voice and data communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 may also comprise additional base stations, controller nodes, telephony switches, internet routers, network gateways, computer systems, communication links, or some other type of communication equipment, and combinations thereof.

Communication links 312, 314, 316, 318 and 320 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304 and 306, controller node 308 and communication network 310 which are omitted for clarity, including additional processing nodes, routers, gateways, and physical and/or wireless data links for carrying data among the various network elements.

Figure 4:
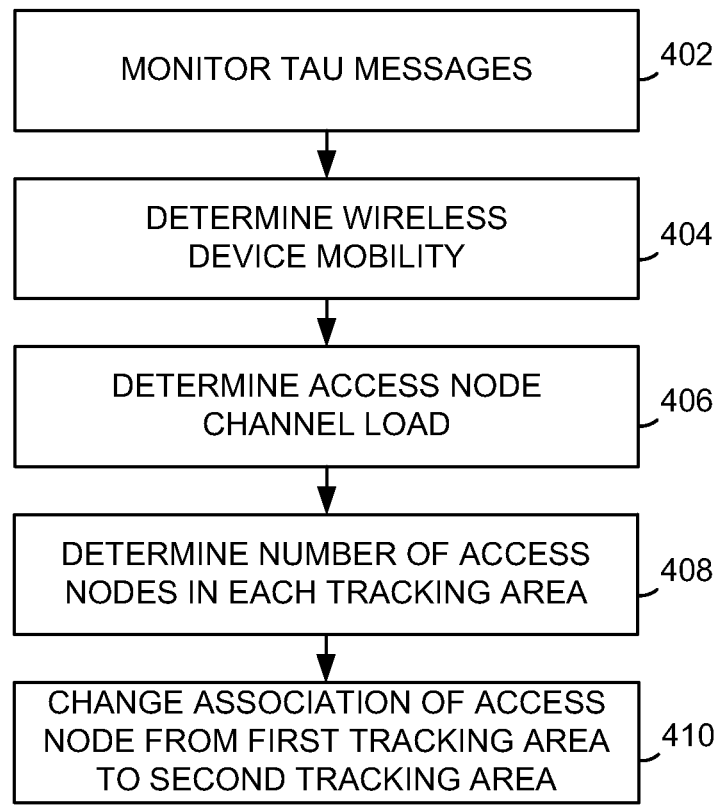
FIG. 4 illustrates another exemplary method of tracking area adjustment.

FIG. 4 illustrates another exemplary method of tracking area adjustment. In operation 402, tracking area update messages are monitored based on a transition of wireless devices from a first access node associated with a first tracking area to a second access node associated with a second tracking area. For example, TAUs received by access node 306 can be monitored. The TAUs can be related to, for example, a transition of wireless device 302 from communication with access node 304 to communication with access node 306. The communication between wireless device 302 and access nodes 304 and 306 can be non-continuous, for example, where wireless device 302 is in an idle mode. As another example, referring to FIG. 1B, TAU messages received by access nodes A1, A2, A3, which can be members of a first tracking group A, and received by access nodes B1, B2, B3, which can be members of a second tracking group B, can be monitored. Excessive TAU messaging can lead to network congestion and inefficient use of network resources.

A threshold can be determined based on the number of TAU messages received by each tracking area. For example, a threshold can be determined based on a number of tracking area update messages in the first tracking area (e.g., tracking area A). As another example, a threshold can be determined based on a number of tracking area update messages in the second tracking area (e.g., tracking area B). In another example, a threshold can be determined based on a comparison of the number of TAU messages received in the first tracking area and the second tracking area. Further, a number of TAU messages received by certain access nodes in each tracking area can be determined, and a threshold can be determined based on the number of TAUs received at each access node. For example, TAU messages can be monitored for access nodes A2 and B2, and a threshold can be determined based on the number of TAU messages received at access node A2, or at access node B2, or based on a comparison between the number of TAU messages received at each of access nodes A2 and B2.

In operation 404, it is determined that the monitored TAU messages are based on a mobility of wireless devices from the first access node to the second access node, and a threshold can be determined based on the mobility of the wireless devices. For example, a direction of mobility of wireless devices can be monitored by communication system 300, for example, at controller node 308. While a wireless device can send a TAU message when the wireless device changes tracking areas, the change in tracking areas may not be due to wireless device mobility. For example, a network operator may configure tracking areas such that different carrier bands or frequency bands of an access node correspond to different tracking areas. In such case, even though a wireless device is not highly mobile, or is even substantially stationary, when the wireless device changes from communicating on a first carrier band to communicating on a second carrier band the wireless device may send a TAU message. Accordingly, in an embodiment, the mobility of wireless devices in communication with access modes 304 and 306 can be determined, and a mobility threshold can be determined based on the mobility of the wireless devices. In an embodiment, the determined level or degree mobility of wireless devices in communication with access node 304 and/or access node 306 can be considered when evaluating the association of access nodes with tracking areas. In an embodiment, the determined direction of mobility of wireless devices in communication with access node 304 and/or access node 306 can be considered when evaluating the association of access nodes with tracking areas.

In operation 406, a channel load of the access node or access nodes is determined, and a threshold can be determined based on the determined channel load. For example, a channel load can be determined for access nodes A2 and B2. Further, the determined channel loading can be considered when evaluating the association of access nodes with tracking areas. A channel load can comprise, for example, a number of wireless devices in communication with an access node, a demand for network resources, an amount of data sent to or from an access node, a backhaul utilization or congestion, and the like.

In operation 408, a number of access nodes in each tracking area is determined. For example, a tracking area configuration may require a minimum number or a maximum number of access nodes in a tracking area. When a number of access nodes in a tracking area meets a minimum number or a maximum number of access nodes, a change of the association of access nodes in the tracking area can be prevented.

In operation 410, when the number of tracking area update messages meets a threshold, the association of the first access node is changed to the second tracking area. For example, when the number of TAU messages meets a threshold, the tracking area association of access node 304 can be changed from the first tracking area to the second tracking area. For example, a number of TAUs received from access node B2 can be monitored, which can be based on a transition of wireless devices from access node A2 associated with a tracking area A to access node B2 associated with a second tracking area B. When the number of TAUs received from access node B2 meets a threshold, the association of access node A2 can be changed from tracking area A to tracking area B.

In an embodiment, the association of the first access node to the second tracking area can be changed when the number of tracking area update messages meets a threshold, and based on a number of access nodes in one of the first tracking area and the second tracking area. For example, the association of access node A2 can be changed from tracking area A to tracking area B when the number of tracking area update messages meets a threshold, and based on a number of access nodes in tracking area A, or based on a number of access nodes in tracking area B, to maintain a minimum or maximum number of access nodes in each tracking area. A minimum number of access nodes in a tracking area can be set as a first criteria, and a maximum number of access nodes in a tracking area can be set as a second criteria. The first and second criteria can differ from tracking area to tracking area. In an embodiment, the association of the first access node to the second tracking area can be changed when a number of access nodes in the first tracking area meets a first criteria. In an embodiment, the association of the first access node to the second tracking area can be changed when a number of access nodes in the second tracking area meets a second criteria.

In an embodiment, the association of the first access node can be changed to the second tracking area during a predetermined period of time when the number of tracking area update messages meets a threshold. The predetermined period of time can be, for example, a predetermined time of day, a predetermined date, and a predetermined period of days. For example, based on a utilization history of access nodes, a historical number of TAU messages can be determined for access nodes of each tracking area, and the association of access nodes to tracking areas can be changed or adjusted based on historical information. In an example, it can be determined that a threshold number of TAU messages is received during a commuting time, or on a particular day or date, or for a particular period of days or times. The tracking area association of access nodes can be changed during a predetermined period of time when the number of tracking area update messages meets a threshold.

Figure 5:
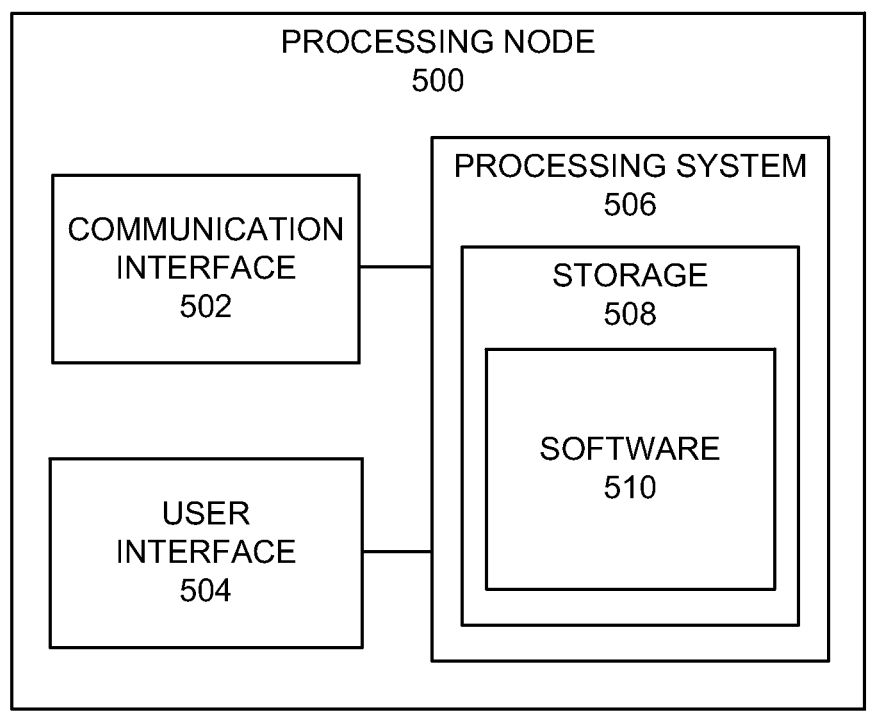
FIG. 5 illustrates an exemplary processing node.

FIG. 5 illustrates an exemplary processing node 500 in a communication system. Processing node 500 comprises communication interface 502, user interface 504 and processing system 506 in communication with communication interface 502 and user interface 504. Processing node 500 is capable of detecting unauthorized tethering by a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include controller node 308, and access nodes 104, 106, 304 and 306. Processing node 500 can also be an adjunct or component of a network element, such as an element of access node 104, 106, 304 or 306, or controller node 308. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of tracking area adjustment, comprising:
monitoring a number of tracking area update messages based on a transition of wireless devices from a first access node associated with a first tracking area to a second access node associated with a second tracking area; and
changing the association of the first access node to the second tracking area when the number of tracking area update messages meets a threshold and based on a number of access nodes in one of the first tracking area and the second tracking area.

2. The method of claim 1, further comprising:
determining that the tracking area updates are based on a mobility of the wireless devices from the first access node to the second access node; and
changing the association of the first access node to the second tracking area when the number of tracking area update messages meets a threshold and based on the mobility of the wireless devices.

3. The method of claim 1, further comprising:
determining a first channel load of the first access node and a second channel load of the second access node; and
changing the association of the first access node to the second tracking area when the number of tracking area update messages meets a threshold and based on the determined first and second channel loads.

4. The method of claim 1, wherein the threshold further comprises a number of tracking area update messages in the first tracking area.

5. The method of claim 1, wherein the threshold further comprises a number of tracking area update messages in the second tracking area.

6. The method of claim 1, further comprising:
changing the association of the first access node to the second tracking area when a number of access nodes in the first tracking area meets a first criteria.

7. The method of claim 1, further comprising:
changing the association of the first access node to the second tracking area when a number of access nodes in the second tracking area meets a second criteria.

8. The method of claim 1, further comprising:
changing the association of the first access node to the second tracking area during a predetermined period of time when the number of tracking area update messages meets a threshold.

9. The method of claim 8, wherein the predetermined period of time is one of a predetermined time of day, a predetermined date, and a predetermined period of days.

10. A system for tracking area adjustment, comprising:
a processing node configured to
monitor a number of tracking area update messages based on a transition of wireless devices from a first access node associated with a first tracking area to a second access node associated with a second tracking area; and
change the association of the first access node to the second tracking area when the number of tracking area update messages meets a threshold and based on a number of access nodes in one of the first tracking area and the second tracking area.

11. The system of claim 10, wherein the processing node is further configured to:
determine that the tracking area updates are based on a mobility of the wireless devices from the first access node to the second access node; and
change the association of the first access node to the second tracking area when the number of tracking area update messages meets a threshold and based on the mobility of the wireless devices.

12. The system of claim 10, wherein the processing node is further configured to:
determine a first channel load of the first access node and a second channel load of the second access node; and
change the association of the first access node to the second tracking area when the number of tracking area update messages meets a threshold and based on the determined first and second channel loads.

13. The system of claim 10, wherein the threshold further comprises a number of tracking area update messages in the first tracking area.

14. The system of claim 10, wherein the threshold further comprises a number of tracking area update messages in the second tracking area.

15. The system of claim 10, wherein the processing node is further configured to:
change the association of the first access node to the second tracking area when a number of access nodes in the first tracking area meets a first criteria.

16. The system of claim 10, wherein the processing node is further configured to:
change the association of the first access node to the second tracking area when a number of access nodes in the second tracking area meets a second criteria.

17. The system of claim 10, wherein the processing node is further configured to:
change the association of the first access node to the second tracking area during a predetermined period of time when the number of tracking area update messages meets a threshold.

18. The system of claim 17, wherein the predetermined period of time is one of a predetermined time of day, a predetermined date, and a predetermined period of days.

* * * * *